United States Patent [19]
Davis

[11] 3,957,229

[45] May 18, 1976

[54] CONVERTIBLE AUXILIARY TURBINE FOR AIRCRAFT

[76] Inventor: Harry C. Davis, 2 Elmwood Ave., Winchester, Mass. 01890

[22] Filed: Feb. 24, 1975

[21] Appl. No.: 552,354

Related U.S. Application Data

[63] Continuation-in-part of Ser. No. 387,205, Aug. 9, 1973, abandoned.

[52] U.S. Cl. ............................ 244/53 R; 60/226 R; 60/271; 244/58; 416/142
[51] Int. Cl.² ......................................... B64D 27/16
[58] Field of Search ............. 244/53 R, 7 R, 58, 60; 416/142; 60/224, 226 R, 271, 262

[56] References Cited
UNITED STATES PATENTS

| | | | |
|---|---|---|---|
| 2,478,206 | 8/1949 | Redding | 60/226 |
| 2,510,570 | 6/1950 | Goddard | 60/271 X |
| 3,404,852 | 10/1968 | Sambell et al. | 416/142 X |
| 3,811,791 | 5/1974 | Cotton | 60/226 R |

FOREIGN PATENTS OR APPLICATIONS 1,940,754   2/1971   Germany........................... 244/7 R

*Primary Examiner*—Trygve M. Blix
*Assistant Examiner*—Barry L. Kelmachter

[57] ABSTRACT

A convertible auxiliary turbine capable of providing turbopropeller thrust interchangeably with pure jet propulsion, comprising a controllable fluid deflector element, and an inverted free-floating rotor having planular drive-vanes aligned with the normal flow direction of the engine's gas stream. Thus, no rotative force is imparted to the turbine until the flow direction is varied. At a given change, the turbine begins to spin, outboard swingable propeller blades are urged to open by action of centrifugal force, and propeller thrust is generated in ratio to the angle of deflection, with jet power in inverse ratio thereto.

7 Claims, 8 Drawing Figures

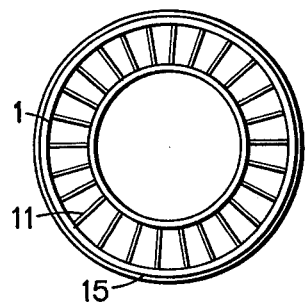
Fig. 3.
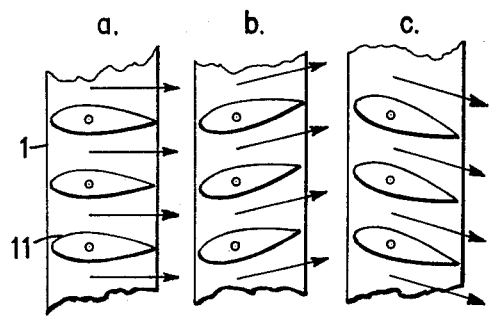
Fig. 4.
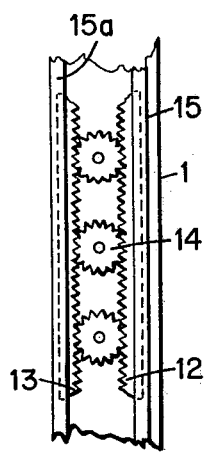
Fig. 5.
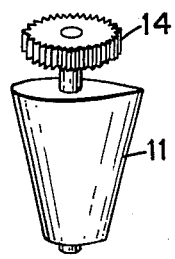
Fig. 6.
Fig. 7.
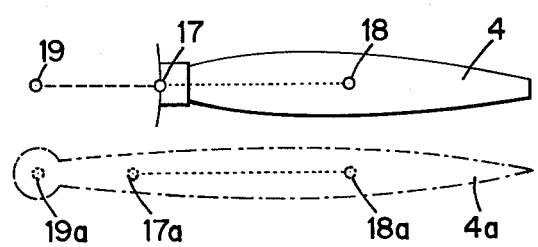
Fig. 8.

CONVERTIBLE AUXILIARY TURBINE FOR AIRCRAFT

This applicaton is a continuation-in-part of Ser. No. 387,205, filed Aug. 9, 1973, now abaondoned.

This invention relates to turbines generally and more particularly to an inverted free-floating turbine having a common axis and structure, capable of controllably transmitting power to an external load while riding an exhaust gas beam.

Although it is not intended that the invention be restrained in form or limited to a precise application, the turbine of my present invention has been designed specifically for aircraft, and such purpose will be emphasized in this disclosure.

It is well known to persons skilled in the art that the turbojet engine presents deficiencies both at take-off and on final, because of its rather flat thrust versus speed curve or unsatisfactory ratio of static to flight thrust, hence the practical need for thrust augmentation of some kind in the above mentioned areas.

Now it is axiomatic in aeronautics, that the conventional aviation propeller is unsurpassed in performance at comparatively low airplane speeds, yet is increasingly inferior to jet propulsion at speeds thereabove, with both performance curves tending to diverge at approximately 375 mph.

To use the best of both modes, convertibility is indicated. However, relative to convertible installations, prior art teaches that the load of an idle power unit is imposed upon the system as a whole. In order to remove such encumbrance, the present invention includes parts capable of dual functioning.

It is among the objects of this invention, therefore, to provide movable parts which perform dual functions when in motion, and singular functions when at rest. For example, the variable deflector operates not only in a control capacity, but also contributes rear-casing structural support, the turbine rotor also constitutes an outer-exhaust cone, rotor drive-vanes additionally serve as struts, and the bearing assembly replaces rear-casing bolted flanges. Wherefore, extra load is minimal or non-existent.

It is another object of my invention to provide an inverted turbine which is forwardly thrust-anchored for rotation, capable of using the tangential force of a propellant fluid for radial support during rotation and non-rotation.

It is a further object of the present invention to provide direct propeller drive by means of hinged propeller blades respectively mounted on, and uniformly arranged around, the perimeter of the turbine transverse to its axis, capable of opening and closing in unison in defined axial planes automatically.

It is an important teaching of this invention that the torque arm relative to propeller load is appreciably shortened.

It is another feature of this invention that annular cool-air ducting is provided, directing its flow to the bearings, the deflectable vanes and actuating mechanism therefor, and thence as a boundary layer heat insulation along the turbine inner-walls and conjoined bases of the rotor drive vanes, in that order.

It is a further feature of this invention that specific fuel consumption is significantly reduced.

It is still a further feature of this invention that jet noise is substantially reduced.

The foregoing and other objects, features and attendant advantages of the present invention will become apparent and understood upon consideration of a detailed description thereof and by reference to the related drawings.

BRIEF DESCRIPTION OF THE DRAWINGS

Main engine components are interrelatedly shown and identified as follows: A, air inlet; B, inlet diffuser; C, axial flow compressor; D, drive shaft; E, combustion chamber; F, turbine wheel; G, inner-exhaust nozzle; I, outboard exhaust; J, turbine nozzle; K, turbine blades.

Numerical reference characters identify in the main constituent parts of the Convertible Auxiliary Turbine, a description of which follows:

FIG. 3 is a front elevational view of the deflector diaphragm shown in FIG. 1,1.

FIG. 4 is a vector diagram illustrating the deflector vanes in cross-section.

FIG. 5 is a sectional side elevation view of the deflector vane actuating mechanism.

FIG. 6 is a perspective view of a deflector vane and pinion.

FIG. 7 is a rear elevational view of the propeller blade closing-springs.

FIG. 8 is a diagram illustrating the torque arm relative to turbine propeller drive.

DETAILED DESCRIPTION OF THE INVENTION

Figure 1:
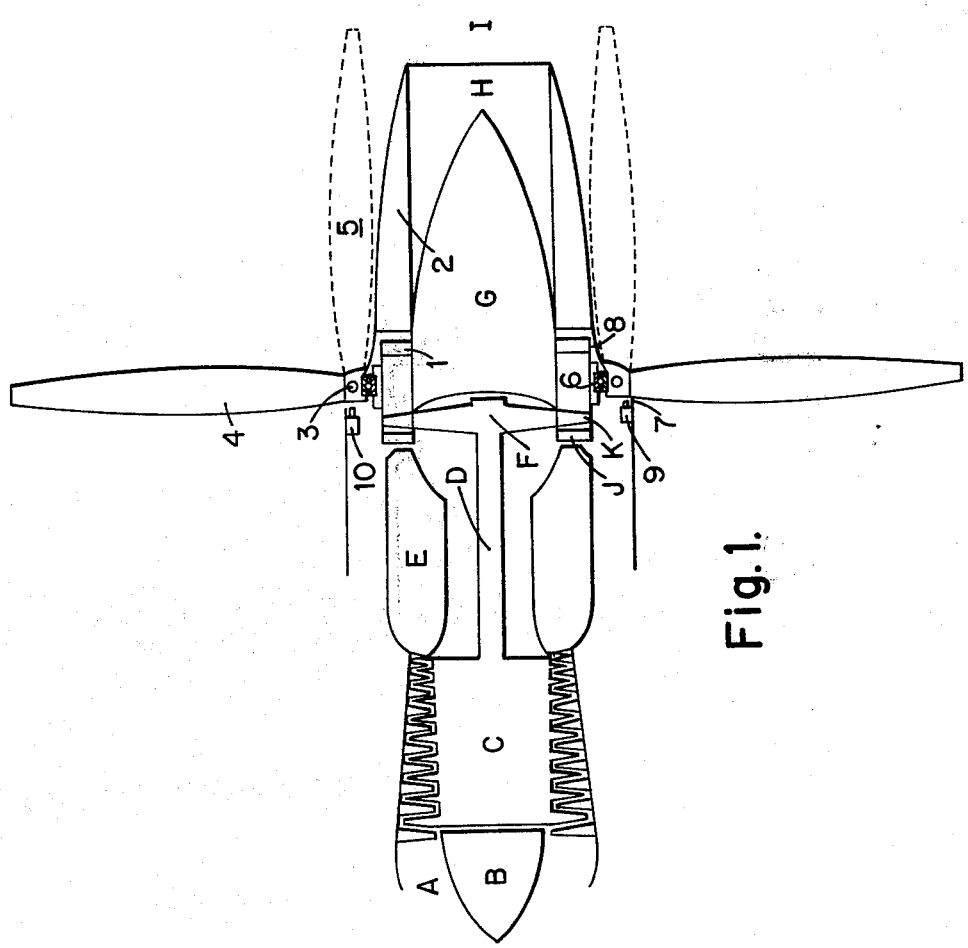
FIG. 1 is a side cross-section view of the present invention in operative connection with a conventional turbojet engine.

Referring to FIG. 3 of the drawings, there is shown at 1 a variable fluid deflector diaphragm having pivotally mounted, Teflon bushed, generally planular, streamlined vanes 11 (see also FIG. 6). Said vanes are additionally shown in cross-section, FIG. 4, in the following positions: a. axial, b. deflecting, c. reverse deflecting, with arrows indicating respective stream directions during passage therethrough. The angle of said vanes, FIG. 4, b. and c. is synchronously determined by an actuating ring mechanism, sectionally shown in mesh, FIG. 5, located on the outer-perimeter of said diaphragm and within an annular passageway for cool air, FIG. 1,8. Said mechanism includes dual annular racks 12 and 13, and pinion 14. Flanges 15 and 15a are rigidly secured to said outer-perimeter and function as channels for sliding members 12 and 13. Opposite circumferential movement of said racks may be provided by any conventional suitably controlled means, at the cockpit's directive, said means being electric, hydraulic or pneumatic.

Figure 2:
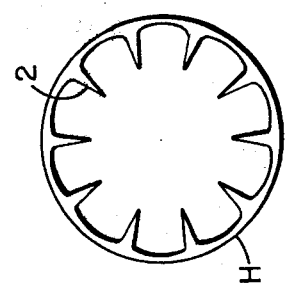
FIG. 2 is a frontal cross-section view of the turbine rotor.

Adjacent, downstream of the deflector diaphragm 1, an inverted free-floating rotor H is stationed in axial alignment therewith, comprising rearwardly convergent walls and, interiorly, a plurality of inverted planular drive-vanes 2 axially aligned, radially disposed and integral therewith, whose configuration is further illustrated in FIG. 2, H and 2.

The periphery of the turbine rotor H is forwardly extended for thrust-anchorage with the main engine structure by means of a bearing assembly 6, or other rotary thrust-linkage. An exterior containing ring 3 is rigidly secured to the extension, concentric with the bearing assembly 6 and is enclosed by an annular streamlined housing.

A plurality of swingable fixed-pitch propeller blades 4 are respectively hinge-mounted transverse to the turbine axis on, and uniformly arranged around, the containing ring 3 for rotation therewith. The said blades are spring-loaded at their respective bases to urge closure into substantial axial parallelism for prevention of aerodynamic drag, as shown by the dotted lines at 5. The closing-springs are severally coiled around said containing ring, and connect said ring to said bases, as shown in FIG. 7. The said blades are further provided with anti-icing vents to register with a mating vent located in the peripheral extension at open 4 and closed 5 positions.

Annular cool-air ducting extending from 7 to 8 directs the flow to the bearings 6, to the deflector diaphragm 1 and actuating mechanism therefor, thence to and along the inner-walls of rotor H and conjoined drive-vane bases 2, there developing a boundary layer insulation for protection of the metallic structure exposed to elevated temperatures under stress, especially during periods of rotation, and thence to atmosphere.

A tachometer operatively connected with the auxiliary unit is shown at 9.

Turbine locks 10 of an electrical, hydraulic or pneumatic type are provided to prevent rotation of the auxiliary unit when idle, and may be controlled manually or automatically.

In a rotary device, a shorter torque arm, obeying the law of the lever, permits a reduction in energy input necessary to produce a desired power output. In FIG. 8 said energy input is represented by a central point of force 17 applied to propeller blade 4, and said power output is represented by a central point of propeller blade load 18. The distance between points 17 and 18 proportionally shows the length of the torque arm of the present invention, and the distance between points 17a and 18a proportionally shows the length of a torque arm of a conventional propeller blade, 4a.

It is assumed for the purpose of comparison that said blades have identical axes of rotation 19 and 19a, equal blade tip diameters, and equal loads.

It is to be noted that the torque arm rotating blade 4 has the shorter of the two lengths depicted. In substantiation thereof, this invention utilizes rather than countervails the action of centrifugal force. In explanation, the conventional turbine rotor vane is twisted about its longitudinal axis in order to deflect the impinging gas axially, which places the central point of force exerted by said vane midway along said axis, FIG. 8, 17a. Whereas, the auxiliary's planular drive-vane 2 allows the impinging gas to press unimpeded against the inner-wall of rotor H and conjoined base of said vane, thereby placing the central point of force 17 farther from axis 19, thus shortening the torque arm.

Jet noise is substantially reduced by formation of a spirally segmented exhaust stream to atmosphere. Such a stream will be formed as the deflected gas stream FIG. 4, b., c. enters the openings defined by the walls of rotor H, drive-vanes 2, and inner-exhaust nozzle G, in effect breaking up the main gas stream. Farther downstream at I a mixing of the spirally segmented exhaust with the atmosphere generates sound waves of higher frequency, some of which are unheard, eliminating a considerable portion of the high energy, longer lasting, low frequency waves so objectionable to listeners on the ground.

In brief, radial support of rotor H is provided by pressure of the motive fluid against the inner-walls of said rotor, whether said fluid be in the form of a spirally segmented exhaust stream, previously shown and described, or in the form of a pure jet exhaust stream, when the auxiliary is at rest, FIG. 4,a.

In detail, the auxiliary utilizes the composition of two kinds of fluid motion, projection and rotation, and the action of centrifugal force. While under the influence of said force, the movement of gas particles causes a cross-sectional pressure gradient, with these results: increased rotative force exerted against the walls of rotor H, increased internal energy in the motive fluid through compressive force, induced acceleration of following gas at the stream's core, reduced angle of deflection, FIG. 4,b., c. to attain desired propeller rpm.

Since the velocity of a jet aircraft exhaust stream in the nozzle normally approaches 1,800 ft. per second, the relevance of the above-stated results as contributory factors in radial support of rotor H becomes apparent. It is also evident that the reaction of the axisymmetric convergent inner-walls of rotor H to the equally distributed tangential force thereagainst will achieve an axial parallelism in said rotor.

During non-rotation of rotor H, the above conclusion will apply effectively, with increased jet reactive force exerted against thrust-linkage 6.

During and after deceleration of the exhaust stream, rotor H is firmly sustained by supplemental support source thrust-linkage 6.

The entire mechanism involves, in certan instances, conventional controls in which no invention is claimed and consequently are not shown in detail. Only those elements necessary to disclose the invention are shown and described herein.

OPERATION OF THE INVENTION

During turbo-propeller drive, power derives from the main gas turbine exhaust stream as its course is turned by the deflector.

Conversely, during pure jet drive, no power derives from the gas stream as its course is unturned by the deflector.

Planular, axially aligned drive-vanes also permit an equal opposite rotative force, or reverse thrust, and an unimpeded translation of exhaust gas when the deflector is aligned therewith.

To initiate turbo-propeller drive, the deflector control setting is varied from zero to a desired degree forward. The turbine locks are released automatically, the turbine begins to spin, centrifugal force opens the propeller blades, and propeller thrust is generated in proportion to deflection, with jet power inverse thereto.

Thus, any portion of exhaust energy may be directly transferred in smooth transition to propeller thrust, reversibly, at any stage of flight.

To restore pure jet drive, the deflector control setting is returned to zero, thereby braking rotation, ambient air and spring pressure close the propeller blades, and locking is effected. Of course, an immediate reverse setting will accelerate the process.

While I have shown and described a preferred form of my invention by way of example, it is to be understood that modifications and variations therein may be made without departing from the spirit and scope of the invention as defined by the appended claims.

I claim:

1. A convertible auxiliary turbine having a common axis and a main engine structure and comprising:

A. a free-floating rotatable exhaust chamber having generally coniform cylindrical walls extending forwardly,
B. means thrust-anchoring said walls to the perimeter of the main engine structure for rotation and support,
C. an inverted rotor having a plurality of planular, elongated drive-vanes axially aligned, radially disposed and interiorly integral with said exhaust chamber walls,
D. an exterior containing ring means and streamlined housing means therefor rigidly secured around said walls, concentric with said thrust-anchoring means,
E. a plurality of aviation propeller blades respectively mounted transverse to the turbine axis, on and uniformly arranged around said containing ring, and swingable thereon in defined axial planes, said blades urgeable to open in unison by action of centrifugal force, and urgeable to close in unison by spring pressure means, and during flight by the resistance of ambient air to the forward moving force of said blades in concert therewith, as means preventing aerodynamic drag,
F. means locking said turbine when idle, and releasing said turbine when active.

2. A device in accordance with claim 1 and including:
A. converting means selectively effecting a turbopropeller or pure jet mode of aircraft propulsion comprising:
   1. a diaphragm in axial alignment with and directly upstream of said rotor drive-vanes including:
      a. an annulus of controllably deflectable, streamlined, generally planular vanes,
      b. said last-mentioned vanes having pivotal mounting means, and
      c. perimetral actuating ring means therefor.

3. A device in accordance with claim 2 and including:
A. annular cool-air ducting means communicating with said thrust-anchoring means, deflectable vanes and actuating means therefor, then directing the path flow along the rotatable exhaust chamber walls and conjoined drive-vane bases as boundary layer heat insulating means, and thence to atmosphere.

4. A device in accordance with claim 3 having radial support means during rotation and non-rotation comprising said exhaust chamber walls being axisymmetric convergent turbine walls co-operating with fluid velocity and equal pressure distribution exerted internally thereagainst, and said thrust-anchoring means upstream thereof.

5. A device in accordance with claim 4 and including said deflectable vanes, said inverted rotor and said thrust-anchoring means having a bearing assembly providing means for dual functioning when in motion, and for singular functioning when at rest.

6. A device in accordance with claim 5 wherein said planular, elongated drive-vanes allow the deflected, impinging gas to press unimpeded against said exhaust chamber walls and conjoined bases of said vanes, thereby placing the central point of force exerted by said gas as far as possible from the turbine axis, as means providing a shorter torque arm relative to an external load.

7. A device in accordance with claim 6 wherein the spirally segmented exhaust to atmosphere during mixing therewith farther downstream generates second waves of higher frequency, thereby eliminating a considerable portion of the longer lasting, high energy, low frequency waves as means substantially reducing jet noise.

* * * * *